United States Patent [19]
Nieuwenhuizen

[11] Patent Number: 5,623,668
[45] Date of Patent: Apr. 22, 1997

[54] METHOD IN A POLLING SYSTEM FOR TRANSMITTING QUEUE ELEMENTS FROM MULTIPLE INPUT QUEUES TO A SINGLE OUTPUT WITH IMPROVED QUEUE SERVICE PERFORMANCE

[75] Inventor: René Nieuwenhuizen, El Den Oever, Netherlands

[73] Assignee: Koninklijke PTT Nederland N.V., Netherlands

[21] Appl. No.: 561,551

[22] Filed: Nov. 21, 1995

Related U.S. Application Data

[63] Continuation of Ser. No. 122,016, Sep. 15, 1993.

[30] Foreign Application Priority Data

Sep. 25, 1992 [NL] Netherlands ............... 9201668

[51] Int. Cl.$^6$ ................................. G06F 13/22
[52] U.S. Cl. ................................. 395/670
[58] Field of Search .................... 395/650, 700

[56] References Cited

U.S. PATENT DOCUMENTS

| 4,543,626 | 9/1985 | Bean et al. | 395/200.03 |
| 4,933,935 | 6/1990 | Adams | 370/85.7 |
| 4,972,314 | 11/1990 | Getzinger et al. | 395/650 |
| 5,048,013 | 9/1991 | Eng et al. | 370/79 |

OTHER PUBLICATIONS

Gagan L. Choudhury, "Polling With A General Service Order Table: Gated Service", *IEEE Infocom '90: The Conference on Computer Communications*, Jun. 1990, pp. 268–276.

Karlsson et al., "Adaptive polling schemes for an ATM bus with bursty arrivals", *Computer Networks and ISDN Systems*, vol. 24, Mar. 1992, pp. 93–103.

*Primary Examiner*—Alvin E. Oberley
*Assistant Examiner*—John Q. Chavis
*Attorney, Agent, or Firm*—Peter L. Michaelson; John T. Peoples; Michaelson & Wallace

[57] ABSTRACT

Method for the polling of queues. A ratio table is derived from, for example, the numbers of elements in the queues at any one moment. The sum S is calculated of the ratio values R(x) to the various queues. Next, a correction factor C(x) is assigned to each queue, which correction factor is equal to S, decreased by the ratio value of that queue. Further an urgency factor U(x) is assigned to each queue. The queue to be polled next is, in each case, the queue with the highest value of U(x) or, for example where values of U(x) are equal, the first occurring queue with that value. Thereafter the urgency factor U(x) of the selected queue is reduced by the value of its correction factor C(x), whilst the urgency factor U(x) of the remaining queues is increased by their ratio value. The queue to be polled next is then again the queue with the highest value of U(x), and so forth. The method is pre-eminently applicable for ATM, eg. for the polling of subscriber terminals in a passive optical network.

4 Claims, 1 Drawing Sheet

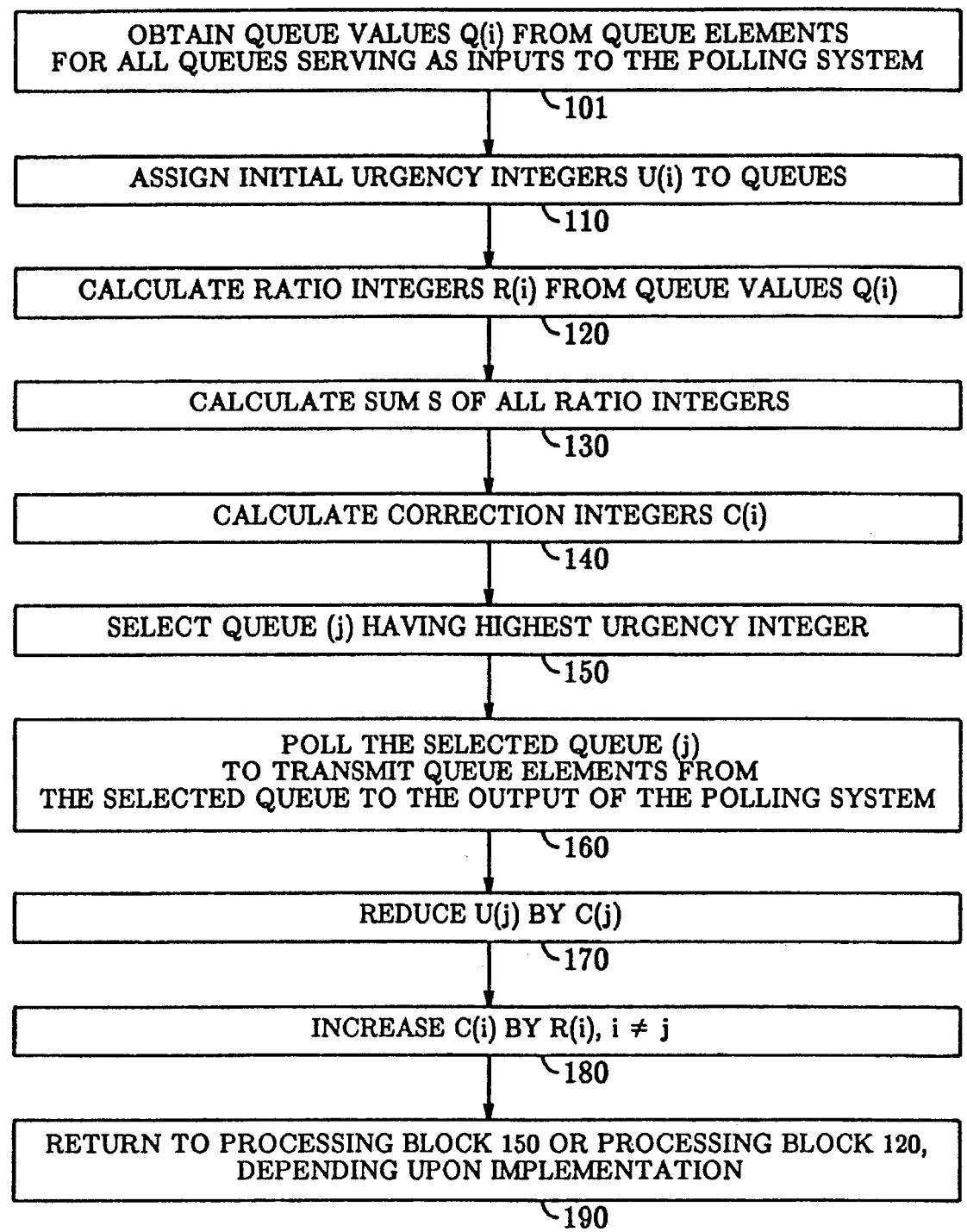
FIGURE

METHOD IN A POLLING SYSTEM FOR TRANSMITTING QUEUE ELEMENTS FROM MULTIPLE INPUT QUEUES TO A SINGLE OUTPUT WITH IMPROVED QUEUE SERVICE PERFORMANCE

CROSS REFERENCE TO RELATED APPLICATION

This application is a continuation of copending patent application serial number entitled "Method for the Conversion of a Polling Frequency Table Into a Polling Sequence Table" filed on Sep. 15, 1993 as Ser. No. 08/122,016.

A. BACKGROUND TO THE INVENTION

The invention relates to a method for the polling of queues, each having a number of queue elements which varies in time and is not known in advance, which method involves forming, from queue values such as the numbers of elements in the various queues or the increase in those numbers of queue elements, a ratio table having ratio values which represent these queue values, which ratio table is subsequently converted into a polling sequence table with a polling sequence which is as regular as possible. This is particularly applicable to the polling of ATM data cells. Such a method is known from, amongst others, a publication entitled Optimizing Of Polling Systems, as authored by O. J. Boxima et al, Report BS-R8932, Centre for Mathematics and Computer Science, P.O. Box 4079, NL-1009AB Amsterdam. The method presented there comprises a number of steps, namely:

Step 1: using queue characteristic values for the various queues, such as the queue size or queue growth, the 'occurrence ratio' (eg. occurrence frequency), is calculated for each queue;

Step 2: using the ratios thus calculated, the polling table size M and the absolute number of occurrences per queue are calculated;

Step 3: using the calculated table size M and the calculated numbers of occurrences per queue, the polling sequence of the various queues is calculated.

In step 3, use is made of a 'random control policy' or of a 'golden ratio policy', both taken from studies as reported by Hofri & Rosberg in the article entitled Packet Delay Under the Golden Ratio Weighted TDM Policy in a Multiple-Access Channel, IEEE Trans. Inform. Theory, Vol. IT-33, pp. 341–349. The performance of the 'random policy' is quite limited. The performance of the 'golden ratio policy' is better, though it requires quite complex mathematical operations, which take a relatively large amount of time, which is quite a significant disadvantage for the handling of ATM data cells which after all, are intended for broadband applications such as B-ISDN.

B. SUMMARY OF THE INVENTION

The object of the invention is to provide a method based on the processing of integers in simple add and compare functions, which results in a fast polling system.

The invention is characterised by the following steps:

Step 1: calculate the ratio values $R(n)$ in the ratio table using the queue values $Q(n)$;

Step 2: calculate the sum S of these ratio values $R(n)$;

Step 3: assign to each queue x a correction factor $C(x)$ which is equal to said sum S of the ratio values, decreased by the ratio value $R(x)$ of that queue x;

Step 4: select the queue i having the highest urgency factor $U(i)$ or, if more queues have this highest urgency factor $U(i)$, select one specific queue i therefrom, for example the first queue occurring in the ratio table having this highest urgency factor $U(i)$;

Step 5: reduce the urgency factor $U(i)$ of that selected queue i by the value of its correction factor $C(i)$;

Step 6: increase the urgency factor $U(x)$ of the remaining queues ($\neq i$) by their ratio value $R(x)$;

Step 7: repeat from step 4 or repeat from step 1 (see below).

The polling sequence table may be calculated once, taking into account unchanging queue values such as the long term average value for the queue size, then may be periodically recalculated. These aspects are dependant on the dynamic behaviour of the queue values and on the desired accuracy of the polling system. It is therefore possible on the one hand to calculate the polling table once and on the other hand to recalculate that table prior to each cycle in which the next queue to be polled is calculated. In the first case a 'jump back' from step 7 to step 4 may be made; in the second case a jump back to step 1 is necessary. Intermediate forms are also possible. For example it is possible to check once per calculation cycle whether the queue values have changed and to recalculate the sequence table only after such a change is detected; this may also occur every n calculation cycles. Below is a worked example in which a check is carried out on every third calculation cycle whether the queue values is changed, and only where this is the case have a new ratio table, the sum of the ratios and new correction factors, calculated. An example is also worked out in which this occurs with each calculation cycle, resulting in a maximum adjustment of the polling sequence table to the dynamic behaviour of the varying supply of the queue elements.

BRIEF DESCRIPTION OF THE DRAWING

The teachings of the present invention can be readily ascertained by considering the following detailed description in conjunction with the accompanying drawing, in which:

The sole FIGURE is a flow diagram of the polling system methodology in accordance with the present invention.

D. ILLUSTRATIVE EMBODIMENTS

The operation of the method according to the invention will be illustrated hereinafter. It is assumed that there are three queues a, b and c, whose 'arrival rate', (supply of the number of queue elements per time unit) at a specific moment is: $Q(a)=3$, $Q(b)=6$, $Q(c)=3$. Below, the steps mentioned above shall be followed in accordance with the invention.

Step 0: Assign to each queue x an initial urgency factor $U(x)$, eg. $U(a)=0$, $U(b)=0$ and $U(c)=0$.

Step 1: The simplest ratio table is that in which the values for $Q(x)$ are adopted, resulting in a ratio table of $R(a)=3$, $R(b)=6$ and $R(c)=3$. If for example the values of $Q(x)$ are much higher, for instance 3357, 5976 and 2840, a decision may also be made to derive simpler ratio numbers from these, for example by dividing the values of $Q(x)$ by 1000 and rounding them to the nearest integers, in that case 3, 6 and 3 once again.

Step 2: The sum $S=R(a)+R(b)+R(c)=12$;

Step 3: The correction factors $C(x)$ become: $C(a)=12 -3=9$, $C(b)=12 -6=6$ and $C(c)=12 -3=9$;

In steps 4, 5 and 6 the next queue to be polled is selected using the values calculated in the previous steps.

Step 4: All urgency factors $U(x)$ are=0 (initial value); then select the first queue with this ('highest') value: queue a.

Step 5: Decrease $U(a)$ by the value of $C(a)$: $U(a):=0 -9=-9$;

Step 6: Increment $U(b)$ and $U(c)$ by the value of $R(b)$ and $R(c)$ respectively: $U(b):=0+6=+6$; $U(c):=0+3=+3$ Step 7: Repeat step 4, 5 and 6:

Step 4: Select queue b, which now, after all, has the highest value of $U(x)$, namely $U(b)=+6$, while $U(a)=-9$ and $U(c)=+3$;

Step 5: Decrease $U(b)$ by $C(b)$: $U(b):=6 -6=0$;

Step 6: Increment $U(a)$ by $R(a)$: $U(a):=-9+3=-6$ and $U(c)$ by $R(c)$: $U(c):=+3+3=+6$;

Step 7: Repeat step 4, 5 and 6:

Step 4: Now select queue c, which now has the highest value of $U(x)$, namely $U(c)=+6$, while $U(a)=-6$ and $U(b)=0$;

Step 5: Decrease $U(c)$ by $C(c)$: $U(c):=+6 -9=-3$;

Step 6: Increment $U(a)$ by $R(a)$: $U(a):=-6+3=-3$ and $U(b)$ by $R(b)$: $U(b):=0 +6=+6$;

Step 7: Repeat step 4, 5 and 6:

And so on . . .

The above may be shown in table form thus:

| Queue names | a | b | c |
|---|---|---|---|
| Queue values | $Q(a) = 3$ | $Q(b) = 6$ | $Q(c) = 3$ |
| Ratio factor | $R = 1$ | | |
| Ratio values | $R(a) = 3$ | $R(b) = 6$ | $R(c) = 3$ |
| Sum ratio values | $S = 12$ | | |
| Correction values | $C(a) = 9$ | $C(b) = 6$ | $C(c) = 9$ |
| P | U(a) | U(b) | U(c) | Selected queue (i) |
| 1 | 0* | 0 | 0 | a |
| 2 | −9 | 6* | 3 | b |
| 3 | −6 | 0 | 6* | c |
| 4 | −3 | 6* | −3 | b |
| 5 | 0* | 0 | 0 | a |
| 6 | −9 | 6* | 3 | b |
| 7 | −6 | 0 | 6* | c |
| 8 | −3 | 6* | −3 | b |
| 9 | 0* | 0 | 0 | a |
| 10 | −9 | 6* | 3 | b |
| 11 | −6 | 0 | 6* | c |
| 12 | −3 | 6* | −3 | b |
| 13 | 0* | 0 | 0 | a |
| 14 | −9 | 6* | 3 | b |
| 15 | −6 | 0 | 6* | c |

With a ratio distribution of 3 - 6 - 3 the calculated polling sequence is therefore a - b - c - b - a - b - c - b - a - etc. (the highest value of $U(x)$ is indicated by an *). It may be obvious that at the moment the queue values measured on the queues change, the polling sequence may also change; in that case the values of $R(a)$, $R(b)$ and $R(c)$ therefore change as well, as do the values of $C(a)$, $C(b)$ and $C(c)$. Such a change can, directly prior to each calculation cycle P, wherein it is calculated which queue is to be used as the next queue, be included in that calculation so that the polling sequence is always optimally adjusted to the incoming flow of queue elements, such as ATM data cells. Changes may also be included in the calculation once every n calculation cycles. This method thus seems very well suited for application in ATM systems, as has already been confirmed by simulations.

The FIGURE depicts flow diagram 100 for carrying out the process of routing queue elements from multiple input queues to a single output of a polling system. With reference to the FIGURE, processing block 101 depicts that each queue has a queue value (Q(i)) determined from characteristics or parameters of the queue elements forming the queue. First, processing block 110 is invoked so as to assign urgency integers U(i) to the queues based upon a pre-selected criterion or pre-selected criteria. As the example demonstrated, the U(i)'s may all be set to the same value if no prior knowledge is available about the relative importance of the queues. Next, processing block 120 is invoked to calculate the ratio integers R(i) in proportion to the queue values Q(i). Then, the processing by block 130 is carried out to calculate the sum S of all the ratio integers. In turn, correction integers C(i) for each queue are computed from S and R(i), as depicted by processing block 140. Once these calculations are complete, it is now possible to select a queue, designated queue j, which has the highest urgency integer U(j) associated with queue j, as indicated by processing block 150. Processing block 160 is now invoked to poll the selected queue to transmit the queue elements from queue j to the single output of the polling system; in this way, the queue having the highest priority is serviced to thereby enhance the performance of the polling system. Once polling has taken place, updating activities occur. Updated first, as evidence by processing block 170, is the U(j) integer which is reduced by the correction integer C(j). Next, all other urgency integers, as per processing block 180, are increased in value by adding the ratio integer R(i) to U(i), i≠j. Finally, processing block 190 is invoked to return to an intermediate block (block 150 or block 120, as exemplified by examples) in flow diagram 100 depending upon the dynamic changes in the queue values.

Some further examples will be given below in which use is made of the following program.

```
100  CLS
110  OPEN"pn.out" FOR APPEND AS#1
120  OPEN"pn.in" FOR INPUT AS#2
130  PRINT "Queue names    a    b    c"
140  PRINT#1, "Queue names    a    b    c"
150  INPUT#2,Q(1),Q(2),Q(3),R
160  IF (Q(1) = Q(1)) AND (Q(2) = Q(2)) AND (Q(3) = Q(3)) GOTO 420
170  Q(1) = Q(1):Q(2) = Q(2):Q(3) = Q(3)
180  PRINT " ":PRINT#1," "
190  PRINT USING "Queue values    Q(a) = ### Q(b) = ### Q(c) = ###";Q(1);Q(2);Q(3)
200  PRINT#1,USING "Queue values    Q(a) = ### Q(b) = ###
     Q(c) = ###";Q(1);Q(2);Q(3)
210  PRINT USING "Ratio factor    R = ###";R
220  PRINT#1,USING "Ratio factor    R = ###";R
```

```
230   S = 0
240   FOR X = 1 TO 3
250   R(X) = INT((Q(X)/R) + .5)
260   S = S + R(X)
270   NEXT X
280   FOR X = 1 TO 3
290   C(X) = S–R(X)
300   NEXT X
310   PRINT USING "Ratio values    R(a) = ### R(b) = ### R(c) = ###";R(1),R(2),R(3)
320   PRINT#1,USING "Ratio values    R(a) = ### R(b) = ###- R(c) = ###";R(1),R(2),R(3)
330   PRINT USING "Sum ratio values S = ###";S
340   PRINT#1,USING "Sum ratio values S = ###";S
350   PRINT USING "Correction values C(a) = ### C(b) = ### C(c) = ###";C(1),C(2),C(3)
360   PRINT#1,USING "Correction values C(a) = ### C(b) = ### C(c) = ###";
      C(1),C(2),C(3)
370   PRINT" "
380   PRINT#1," "
390   PRINT   " P    U(a)    U(b)    U(c)   Selected- queue (i)
400   PRINT#1,  " P    U(a)    U(b)    U(c) Selected-queue (i)
410   PRINT#1," "
420   FOR P = 1 TO 3
430   IF (U(1)>=U(2)) AND (U(1)>=U(3)) THEN Q$ = "a":M$(1) = "*":
      M$(2) = " ":M$(3) = " ":GOTO 460
440   IF (U(2)>=U(3)) AND (U(2)>=U(1)) THEN Q$ = "b":M$(1) = " 
      ":M$(2) = "*":M$(3) = " ":GOTO 460
450   IF (U(3)>= U(1)) AND (U(3)>=U(2)) THEN Q$ = "c":M$(1) = " ":M$(2) = " 
      ":M$(3) = "*":GOTO 460
460   N = N + 1
470   PRINT USING "### ###& ###& ###&    &";N,U(1),M$(1),U(2),
      M$(2),U(3),M$(3),Q$
480   PRINT#1,USING "### ###& ###& ###&    &";N,U(1),M$(1),
      U(2),M$(2),U(3),M$(3),Q$
490   IF Q$ = "a" THEN U(1) = U(1)–C(1):U(2) = U(2) + R(2):U(3) = U(3) + R(3)
500   IF Q$ = "b" THEN U(2) = U(2)–C(2):U(1) = U(1) + R(1):U(3) = U(3) + R(3)
510   IF Q$ = "c" THEN U(3) = U(3)–C(3):U(1) = U(1) + R(1):U(2) = U(2) + R(2)
520   NEXT P
530   IF EOF(2) GOTO 550
540   GOTO 150
550   CLOSE
560   SYSTEM
```

In the program above, a check is carried out, after every third calculation cycle in which a queue is guided, whether any change has occurred in the queues for example a change in the number of elements located in the queue, (or for example a change in the net increase/decrease). In the example above no change occurred; the queue values therefore remained constant in the period considered, (the new values are presented only when changes occur).

Below, firstly, a situation in which the queue values are greater than in the above example by a factor of 100.

| Queue names | a | b | c |
|---|---|---|---|
| Queue values | Q(a) = 286 | Q(b) = 598 | Q(c) = 326 |
| Ratio factor | R = 100 | | |
| Ratio values | R(a) = 3 | R(b) = 6 | R(c) = 3 |
| Sum ratio values | S = 12 | | |
| Correction values | C(a) = 9 | C(b) = 6 | C(c) = 9 |
| P | U(a) | U(b) | U(c) | Selected queue (i) |
| 1 | 0* | 0 | 0 | a |
| 2 | –9 | 6* | 3 | b |
| 3 | –6 | 0 | 6* | c |
| 4 | –3 | 6* | –3 | b |
| 5 | 0* | 0 | 0 | a |
| 6 | –9 | 6* | 3 | b |
| 7 | –6 | 0 | 6* | c |
| 8 | –3 | 6* | –3 | b |
| 9 | 0* | 0 | 0 | a |
| 10 | –9 | 6* | 3 | b |
| 11 | –6 | 0 | 6* | c |
| 12 | –3 | 6* | –3 | b |
| 13 | 0* | 0 | 0 | a |
| 14 | –9 | 6* | 3 | b |
| 15 | –6 | 0 | 6* | c |

By dividing the queue values by a ratio factor of 100 and using the nearest integers as valves for the ratio table, the same situation is created as in the first example. Owing to the fairly large ratio factor a slight inaccuracy is introduced in the queue selection as may be seen from the example below, in which a smaller ratio factor is used thereby making the selection more accurate.

| Queue names | a | b | c |
|---|---|---|---|
| Queue values | Q(a) = 286 | Q(b) = 598 | Q(c) = 326 |
| Ratio factor | R = 10 | | |
| Ratio values | R(a) = 29 | R(b) = 60 | R(c) = 33 |
| Sum ratio values | S = 122 | | |
| Correction values | C(a) = 93 | C(b) = 62 | C(c) = 89 |
| P | U(a) | U(b) | U(c) | Selected queue (i) |
| 1 | 0* | 0 | 0 | a |
| 2 | –93 | 60* | 33 | b |
| 3 | –64 | –2 | 66* | c |
| 4 | –35 | 58* | –23 | b |
| 5 | –6 | –4 | 10* | c |
| 6 | 23 | 56* | –79 | b |
| 7 | 52* | –6 | –46 | a |
| 8 | –41 | 54* | –13 | b |
| 9 | –12 | –8 | 20* | c |
| 10 | 17 | 52* | –69 | b |
| 11 | 46* | –10 | –36 | a |
| 12 | –47 | 50* | –3 | b |
| 13 | –18 | –12 | 30* | c |
| 14 | 11 | 48* | –59 | b |
| 15 | 40* | –14 | –26 | a |

An example is given below of a situation in which the queue values change rapidly. The changed situation (which is indicated in each case), is taken into account on every third calculation cycle.

| Queue names    | a          | b          | c          |
|----------------|------------|------------|------------|
| Queue values   | Q(a) = 286 | Q(b) = 598 | Q(c) = 326 |
| Ratio factor   | R = 10     |            |            |
| Ratio values   | R(a) = 29  | R(b) = 60  | R(c) = 33  |
| Sum ratio values | S = 122  |            |            |
| Correction values | C(a) = 93 | C(b) = 62 | C(c) = 89 |
| P  | U(a) | U(b) | U(c) | Selected queue (i) |
| 1  | 0*   | 0    | 0    | a |
| 2  | −93  | 60*  | 33   | b |
| 3  | −64  | −2   | 66*  | c |
| Queue values   | Q(a) = 286 | Q(b) = 635 | Q(c) = 326 |
| Ratio factor   | R = 10     |            |            |
| Ratio values   | R(a) = 29  | R(b) = 64  | R(c) = 33  |
| Sum ratio values | S = 126  |            |            |
| Correction values | C(a) = 97 | C(b) = 62 | C(c) = 93 |
| P  | U(a) | U(b) | U(c) | Selected queue (i) |
| 4  | −35  | 58*  | −23  | b |
| 5  | −6   | −4   | 10*  | c |
| 6  | 23   | 60*  | −83  | b |
| Queue values   | Q(a) = 234 | Q(b) = 635 | Q(c) = 326 |
| Ratio factor   | R = 10     |            |            |
| Ratio values   | R(a) = 23  | R(b) = 64  | R(c) = 33  |
| Sum ratio values | S = 120  |            |            |
| Correction values | C(a) = 97 | C(b) = 56 | C(c) = 87 |
| P  | U(a) | U(b) | U(c) | Selected queue (i) |
| 7  | 52*  | −2   | −50  | a |
| 8  | −45  | 62*  | −17  | b |
| 9  | −22  | 6    | 16*  | c |
| Queue values   | Q(a) = 234 | Q(b) = 635 | Q(c) = 376 |
| Ratio factor   | R = 10     |            |            |
| Ratio values   | R(a) = 23  | R(b) = 64  | R(c) = 38  |
| Sum ratio values | S = 125  |            |            |
| Correction values | C(a) = 102 | C(b) = 61 | C(c) = 87 |
| P  | U(a) | U(b) | U(c) | Selected queue (i) |
| 10 | 1    | 70*  | −71  | b |
| 11 | 24*  | 9    | −33  | a |
| 12 | −78  | 73*  | 5    | b |
| Queue values   | Q(a) = 198 | Q(b) = 635 | Q(c) = 376 |
| Ratio factor   | R = 10     |            |            |
| Ratio values   | R(a) = 20  | R(b) = 64  | R(c) = 38  |
| Sum ratio values | S = 122  |            |            |
| Correction values | C(a) = 102 | C(b) = 58 | C(c) = 84 |
| P  | U(a) | U(b) | U(c) | Selected queue (i) |
| 13 | −55  | 12   | 43*  | c |
| 14 | −35  | 76*  | −41  | b |
| 15 | −15  | 18*  | −3   | b |

It will be obvious that it is equally possible to check whether a change has occurred in the queue values within the queues on every calculation cycle, rather than on every third calculation cycle. This is assumed in the example below, in which prior to each queue selection, any change in the queue values with respect to the previous selection is detected; only in that case are the changed queue values presented and the values for R(x), S and C(x) recalculated.

The progress of queue values in time is as follows:

| 1  | 286 - 598 - 326 |
| 2  | 286 - 635 - 326 |
| 3  | 234 - 635 - 326 |
| 4  | 234 - 635 - 376 |
| 5  | 198 - 635 - 376 |
| 6  | 198 - 635 - 376 |
| 7  | 198 - 635 - 376 |
| 8  | 198 - 635 - 376 |
| 9  | 255 - 698 - 467 |
| 10 | 255 - 698 - 467 |
| 11 | 287 - 751 - 501 |
| 12 | 287 - 751 - 501 |
| 13 | 302 - 923 - 578 |
| 14 | 302 - 923 - 578 |
| 15 | 302 - 923 - 578 |

The polling sequence table calculation then looks as follows:

| Queue names    | a          | b          | c          |
|----------------|------------|------------|------------|
| Queue values   | Q(a) = 286 | Q(b) = 598 | Q(c) = 326 |
| Ratio factor   | R = 10     |            |            |
| Ratio values   | R(a) = 29  | R(b) = 60  | R(c) = 33  |
| Sum ratio values | S = 122  |            |            |
| Correction values | C(a) = 93 | C(b) = 62 | C(c) = 89 |
| P  | U(a) | U(b) | U(c) | Selected queue (i) |
| 1  | 0*   | 0    | 0    | a |
| Queue values   | Q(a) = 286 | Q(b) = 635 | Q(c) = 326 |
| Ratio factor   | R = 10     |            |            |
| Ratio values   | R(a) = 29  | R(b) = 64  | R(c) = 33  |
| Sum ratio values | S = 126  |            |            |
| Correction values | C(a) = 97 | C(b) = 62 | C(c) = 93 |
| P  | U(a) | U(b) | U(c) | Selected queue (i) |
| 2  | −93  | 60*  | 33   | b |
| Queue values   | Q(a) = 234 | Q(b) = 635 | Q(c) = 326 |
| Ratio factor   | R = 10     |            |            |
| Ratio values   | R(a) = 23  | R(b) = 64  | R(c) = 33  |
| Sum ratio values | S = 120  |            |            |
| Correction values | C(a) = 97 | C(b) = 56 | C(c) = 87 |
| P  | U(a) | U(b) | U(c) | Selected queue (i) |
| 3  | −64  | −2   | 66*  | c |
| Queue values   | Q(a) = 234 | Q(b) = 635 | Q(c) = 376 |
| Ratio factor   | R = 10     |            |            |
| Ratio values   | R(a) = 23  | R(b) = 64  | R(c) = 38  |
| Sum ratio values | S = 125  |            |            |
| Correction values | C(a) = 102 | C(b) = 61 | C(c) = 87 |
| P  | U(a) | U(b) | U(c) | Selected queue (i) |
| 4  | −41  | 62*  | −21  | b |
| Queue values   | Q(a) = 198 | Q(b) = 635 | Q(c) = 376 |
| Ratio factor   | R = 10     |            |            |
| Ratio values   | R(a) = 20  | R(b) = 64  | R(c) = 38  |
| Sum ratio values | S = 122  |            |            |
| Correction values | C(a) = 102 | C(b) = 58 | C(c) = 84 |
| P  | U(a) | U(b) | U(c) | Selected queue (i) |
| 5  | −18  | 1    | 17*  | c |
| 6  | 2    | 65*  | −67  | b |
| 7  | 22*  | 7    | −29  | a |
| 8  | −80  | 71*  | 9    | b |
| Queue values   | Q(a) = 255 | Q(b) = 698 | Q(c) = 467 |
| Ratio factor   | R = 10     |            |            |
| Ratio values   | R(a) = 26  | R(b) = 70  | R(c) = 47  |
| Sum ratio values | S = 143  |            |            |
| Correction values | C(a) = 117 | C(b) = 73 | C(c) = 96 |
| P  | U(a) | U(b) | U(c) | Selected queue (i) |
| 9  | −60  | 13   | 47*  | c |
| 10 | −34  | 83*  | −49  | b |
| Queue values   | Q(a) = 287 | Q(b) = 751 | Q(c) = 501 |
| Ratio factor   | R = 10     |            |            |
| Ratio values   | R(a) = 29  | R(b) = 75  | R(c) = 50  |
| Sum ratio values | S = 154  |            |            |
| Correction values | C(a) = 125 | C(b) = 79 | C(c) = 104 |
| P  | U(a) | U(b) | U(c) | Selected queue (i) |
| 11 | −8   | 10*  | −2   | b |
| 12 | 21   | −69  | 48*  | c |
| Queue values   | Q(a) = 302 | Q(b) = 923 | Q(c) = 578 |
| Ratio factor   | R = 10     |            |            |
| Ratio values   | R(a) = 30  | R(b) = 92  | R(c) = 58  |
| Sum ratio values | S = 180  |            |            |
| Correction values | C(a) = 150 | C(b) = 88 | C(c) = 122 |
| P  | U(a) | U(b) | U(c) | Selected queue (i) |
| 13 | 50*  | 6    | −56  | a |
| 14 | −100 | 98*  | 2    | b |
| 15 | −70  | 10   | 60*  | c |

Presented in shorter form:

| Calculation Cycle | Queue values    | Selected queue |
|-------------------|-----------------|----------------|
| 1                 | 286 - 598 - 326 | a              |
| 2                 | 286 - 635 - 326 | b              |
| 3                 | 234 - 635 - 326 | c              |
| 4                 | 234 - 635 - 376 | b              |
| 5                 | 198 - 635 - 376 | c              |
| 6                 | 198 - 635 - 376 | b              |
| 7                 | 198 - 635 - 376 | a              |
| 8                 | 198 - 635 - 376 | b              |

-continued

| Calculation Cycle | Queue values | Selected queue |
|---|---|---|
| 9 | <u>255</u> - <u>698</u> - <u>467</u> | c |
| 10 | 255 - 698 - 467 | b |
| 11 | <u>287</u> - <u>751</u> - <u>501</u> | b |
| 12 | 287 - 751 - 501 | c |
| 13 | <u>302</u> - <u>923</u> - <u>578</u> | a |
| 14 | 302 - 923 - 578 | b |
| 15 | 302 - 923 - 578 | c |

For simplicity three queues are assumed in the above examples. It will be obvious that this number may be increased in a simple manner.

One important application for the method according to the invention is to be found in systems in which it must be possible to adjust the service allocation quickly to a changing service requirement. One example of a system in which a rapidly changing queue service requirement occurs is the ATM Passive Optical Network, in which multiple users are connected to one local exchange by means of a glass fibre branched like a tree. Here, the user queues with ATM data cells can be efficiently read out making use of the method presented above.

If the polling table is continuously adjusted to the service requirement, the choice of the initial values of U(a), U(b) and U(c) is not critical. Where, however, the polling table is used in a semi-static way, the initial values are more importance. Practical experience has shown that a good solution is found if the initial values used are the sum S of the ratio values minus the whole number portion of the quotient of this sum S and the ratio value R(a), R(b) and R(c) respectively. In the last example the following hold good:
Ratio values R(a)=29 R(b)=60 R(c)=33
Sum ratio values S=122

If the above rule is used, the initial values of U(a,b,c) become:

$U_i(a)=S-(S \text{ DIV } R(a))=122-(122 \text{ DIV } 29)=122-4=118$
$U_i(b)=S-(S \text{ DIV } R(b))=122-(122 \text{ DIV } 60)=122-2=120$
$U_i(c)=S-(S \text{ DIV } R(c))=122-(122 \text{ DIV } 33)=122-3=119$ The polling table calculation result then becomes (starting from the same queue values above):

| Queue names | a | b | c |
|---|---|---|---|
| Queue values | Q(a) = 286 | Q(b) = 598 | Q(c) = 326 |
| Ratio factor | R = 10 | | |
| Ratio values | R(a) = 29 | R(b) = 60 | R(c) = 33 |
| Sum ratio values | S = 122 | | |
| Correction values | C(a) = 93 | C(b) = 62 | C(c) = 89 |
| P  U(a) | U(b) | U(c) | Selected queue (i) |
| 1  <u>118</u> | <u>120</u>* | <u>119</u> | b |
| Queue values | Q(a) = 286 | Q(b) = 635 | Q(c) = 326 |
| Ratio factor | R = 10 | | |
| Ratio values | R(a) = 29 | R(b) = 64 | R(c) = 33 |
| Sum ratio values | S = 126 | | |
| Correction values | C(a) = 97 | C(b) = 62 | C(c) = 93 |
| P  U(a) | U(b) | U(c) | Selected queue (i) |
| 2  147 | 58 | 152* | c |
| Queue values | Q(a) = 234 | Q(b) = 635 | Q(c) = 326 |
| Ratio factor | R = 10 | | |
| Ratio values | R(a) = 23 | R(b) = 64 | R(c) = 33 |
| Sum ratio values | S = 120 | | |
| Correction values | C(a) = 97 | C(b) = 56 | C(c) = 87 |
| P  U(a) | U(b) | U(c) | Selected queue (i) |
| 3  176* | 122 | 59 | a |
| Queue values | Q(a) = 234 | Q(b) = 635 | Q(c) = 376 |
| Ratio factor | R = 10 | | |
| Ratio values | R(a) = 23 | R(b) = 64 | R(c) = 38 |
| Sum ratio values | S = 125 | | |
| Correction values | C(a) = 102 | C(b) = 61 | C(c) = 87 |
| P  U(a) | U(b) | U(c) | Selected queue (i) |
| 4  79 | 186* | 92 | b |
| Queue values | Q(a) = 198 | Q(b) = 635 | Q(c) = 376 |
| Ratio factor | R = 10 | | |
| Ratio values | R(a) = 20 | R(b) = 64 | R(c) = 38 |
| Sum ratio values | S = 122 | | |
| Correction values | C(a) = 102 | C(b) = 58 | C(c) = 84 |
| P  U(a) | U(b) | U(c) | Selected queue (i) |
| 5  102 | 125 | 130* | c |
| 6  122 | 189* | 46 | b |
| 7  142* | 131 | 84 | a |
| 8  40 | 195* | 122 | b |
| Queue values | Q(a) = 255 | Q(b) = 698 | Q(c) = 467 |
| Ratio factor | R = 10 | | |
| Ratio values | R(a) = 26 | R(b) = 70 | R(c) = 47 |
| Sum ratio values | S = 143 | | |
| Correction values | C(a) = 117 | C(b) = 73 | C(c) = 96 |
| P  U(a) | U(b) | U(c) | Selected queue (i) |
| 9  60 | 137 | 160* | c |
| 10  86 | 207* | 64 | b |
| Queue values | Q(a) = 287 | Q(b) = 751 | Q(c) = 501 |
| Ratio factor | R = 10 | | |
| Ratio values | R(a) = 29 | R(b) = 75 | R(c) = 50 |
| Sum ratio values | S = 154 | | |
| Correction values | C(a) = 125 | C(b) = 79 | C(c) = 104 |
| P  U(a) | U(b) | U(c) | Selected queue (i) |
| 11  112 | 134* | 111 | b |
| 12  141 | 55 | 161* | c |
| Queue values | Q(a) = 302 | Q(b) = 923 | Q(c) = 578 |
| Ratio factor | R = 10 | | |
| Ratio values | R(a) = 30 | R(b) = 92 | R(c) = 58 |
| Sum ratio values | S = 180 | | |
| Correction values | C(a) = 150 | C(b) = 88 | C(c) = 122 |
| P  U(a) | U(b) | U(c) | Selected queue (i) |
| 13  170* | 130 | 57 | a |
| 14  20 | 222* | 115 | b |
| 15  50 | 134 | 173* | c |

As may be seen, a change to the initial values affects only the result of the first three calculation cycles (P=1 . . . 3)

A comment such as that made with respect to the choice of the initial values of the urgency factors U(a,b,c) may also be made in relation to the choice of the ratio factor R. A ratio factor R=1 gives the most accurate result; the (measured) queue values are then also the ratio values to be used for the calculation. If, however, the queue values are extremely large and in particular if the nature of the polling table is static, and must therefore (during a period) be stored, for example, in a RAM (with limited buffer capacity), a reduced representation, represented by the ratio values of queue values must be made using a ratio factor >1. An additional problem here is that the maximum transmission speed may not be exceeded (if use is made of queue values which represent the supply of queue elements per time unit). The following is a good solution for the calculation of the ratio values. Assume the following queue values (supply of queue elements per time unit in kbit/sec): 70000, 19000, 18500, 22333, and 8000. The total band width required for this is 137833 kbit/sec. Assume that the maximum transmission band width is 140000 kbit/sec. An initial solution is to carry out an integer division of the remaining band width of 140000−137833=2167 by the number of queues (5): 2167 DIV 5=433, and subsequently to divide the various queue growth values by that quotient: 70000 DIV 433=161; 19000 DIV 433=43; 18500 DIV 433=42; 22333 DIV 433=51 and 8000 DIV 433=18.

Preferably, these ratio values are then each incremented by 1, making use of almost the entire transmission capacity of 140000 kbit/sec; the ratio values therefore then become 162, 44, 43, 52 and 19. It should be pointed out that the ratio factor for different queues has a somewhat different value, namely in this case 70000/162=432, 19000/44=431, 18500/43=430, 22333/52=429 and 8000/19=421.

Another solution for the calculation of the optimal reduced representation of the queue values operates as follows. Step 1: add 1 to the odd queue values; these values then become 70000, 19000, 18500, 22333+1=22334 and 8000; the remaining band width now becomes 2167−1=2166. Step 2: divide the queue values and the remaining band width by 2 and add 1 to the resulting odd values; the new values then become 35000, 9500, 9250, 11167+1=11168, 4000; the new remainder is 1082 (2166/2=1083, from which 1 is subtracted to increase the value of 11167 by 1). Step 2 is repeated until the remaining band width is minimal, that is to say, if step 2 were repeated once more, then the remaining band width would become negative. In this case the following ratio values are the result of repeating step 2 8 times: 137, 38, 37, 44 and 16; the remaining band width is 1 (kbit/sec).

The above methods for calculating optimal ratio values from the queue values, which ratio values in turn then form the input for the calculation of the optimal polling sequence, achieve maximum use of the (total) band width—thus maximising the transmission speed of the queue elements—without exceeding that band width. In this way, the aspects discussed ensure that the queue elements from the various queues are read out (polled) in a regular sequence and sufficiently frequently, (that is to say so frequently that the queue does not overflow), and that transmission speed of these elements, eg. of ATM cells from subscribers in a passive optical subscriber network, is maximised, without however allowing the permissible transmission speed (bit rate) to be exceeded.

I claim:

1. A method in a polling system for sequentially and selectively routing queue elements from multiple input queues to a single output of the polling system, each queue having a queue value $Q(i), 1=1, \ldots, N$ where N is the number of queues, the queue values being variable in time or not known in advance, the queue values being indicative of, for example, the number of queue elements in each queue, or the increase in the number of queue elements in each queue, the method comprising the steps of assigning urgency integers $U(1), \ldots, U(N)$ to the queues based on one or more pre-selected criteria upon initialization of said method, calculating ratio integers $R(1), \ldots, R(N)$ in proportion to the queue values $Q(1), \ldots, Q(N)$, respectively, calculating the sum S of all of the ratio integers $R(i), i=1, \ldots, N$, calculating correction integers $C(1), \ldots, C(N)$ for the queues wherein $C(i)=S-R(i)$ for each i, selecting a queue j having the highest urgency integer $U(j)$ to identify a selected queue, $j=1, \ldots, N$, polling the selected queue to transmit queue elements from the selected queue to the single output of the polling system, reducing the urgency integer $U(j)$ of said selected queue by its corresponding correction integer $C(j)$, increasing all other urgency integers $U(i), i \neq j$, by their corresponding ratio integers $R(i)$, and returning to said step of selecting.

2. A method in a polling system for sequentially and selectively routing queue elements from multiple input queues to a single output of the polling system, each queue having a queue value $Q(i), 1=1, \ldots, N$ where N is the number of queues, the queue values being variable in time or not known in advance, the queue values being indicative of, for example, the number of queue elements in each queue, or the increase in the number of queue elements in each queue, the method comprising the steps of assigning urgency integers $U(1), \ldots, U(N)$ to the queues based on one or more pre-selected criteria upon initialization of said method, calculating ratio integers $R(1), \ldots, R(N)$ in proportion to the queue values $Q(1), \ldots, Q(N)$, respectively, calculating the sum S of all of the ratio integers $R(i), i=1, \ldots, N$, calculating correction integers $C(1), \ldots, C(N)$ for the queues wherein $C(i)=S-R(i)$ for each i, selecting a queue j having the highest urgency integer $U(j)$ to identify a selected queue, $j=1, \ldots, N$, polling the selected queue to transmit queue elements from the selected queue to the single output of the polling system, reducing the urgency integer $U(j)$ of said selected queue by its corresponding correction integer $C(j)$, increasing all other urgency integers $U(i), i \neq j$, by their corresponding ratio values $R(i)$, and returning to said step of calculating ratio integers.

3. A method in an ATM system for sequentially and selectively routing data cells from multiple input queues to a transmission medium for propagation to a local exchange serving the ATM system, each queue having a queue value $Q(i), 1=1, \ldots, N$ where N is the number of queues, the queue values being variable in time or not known in advance, the queue values being indicative of, for example, the number of data cells in each queue, or the increase in the number of data cells in each queue, the method comprising the steps of assigning urgency integers $U(1), \ldots, U(N)$ to the queues based on one or more pre-selected criteria upon initialization of said method, calculating ratio integers $R(1), \ldots, R(N)$ in proportion to the queue values $Q(1), \ldots, Q(N)$, respectively, calculating the sum S of all of the ratio integers $R(i), i=1, \ldots, N$, calculating correction integers $C(1), \ldots, C(N)$ for the queues wherein $C(i)=S-R(i)$ for each i, selecting a queue j having the highest urgency integer $U(j)$ to identify a selected queue, $j=1, \ldots, N$, polling the selected queue to propagate data cells from the selected queue over the transmission medium, reducing the urgency integer $U(j)$ of said selected queue by its corresponding correction integer $C(j)$, increasing all other urgency integers $U(i), i \neq j$, by their corresponding ratio integers $R(i)$, and returning to said step of selecting.

4. A method in an ATM system for sequentially and selectively routing data cells from multiple input queues to a transmission medium for propagation to a local exchange serving the ATM system, each queue having a queue value $Q(i), 1=1, \ldots, N$ where N is the number of queues, the queue values being variable in time or not known in advance, the queue values being indicative of, for example, the number of data cells in each queue, or the increase in the number of data cells in each queue, the method comprising the steps of assigning urgency integers $U(1), \ldots, U(N)$ to the queues based on one or more pre-selected criteria upon initialization of said method, calculating ratio integers $R(1), \ldots, R(N)$ in proportion to the queue values $Q(1), \ldots, Q(N)$, respectively, calculating the sum S of all of the ratio integers $R(i)$, $i=1, \ldots, N$, calculating correction integers $C(1), \ldots, C(N)$ for the queues wherein $C(i)=S-R(i)$ for each i, selecting a queue j having the highest urgency integer $U(j)$ to identify a selected queue, $j=1, \ldots, N$, polling the selected queue to propagate data cells from said selected queue over the transmission medium, reducing the urgency integer $U(j)$ of said selected queue by its corresponding correction integer $C(j)$, increasing all other urgency integers $U(i)$, $i \neq j$, by their corresponding ratio values $R(i)$, and returning to said step of calculating ratio integers.

* * * * *